Patented Mar. 2, 1926.

1,574,988

UNITED STATES PATENT OFFICE.

CARL MARX, OF WYOMING, MILBURN TOWNSHIP, ESSEX COUNTY, NEW JERSEY, ASSIGNOR TO UNION SULPHUR COMPANY, A CORPORATION OF NEW JERSEY.

METHOD OF PRODUCING PURIFIED SULPHUR FROM IMPURE SULPHUR OR ORES CONTAINING THE SAME IN ELEMENTAL FORM.

No Drawing.   Application filed December 19, 1922.   Serial No. 607,898.

*To all whom it may concern:*

Be it known that I, CARL MARX, a citizen of the United States, residing in Wyoming, Milburn Township, Essex County, New Jersey, have invented a new and useful Method of Producing Purified Sulphur from Impure Sulphur or Ores Containing the Same in Elemental Form, of which the following is a specification.

Sulphur has been produced from ores containing the same in elemental form by several methods, that employed largely in Sicily being to melt the sulphur from the ore by the aid of heat. Deposits of sulphur occurring in the United States, notably those in Louisiana and Texas, have been exploited by the use of a process involving melting the sulphur beneath the surface by means of superheated water, and pumping the sulphur to the surface in the liquid form.

While the latter process has proved successful for the working of sulphur deposits occurring a considerable distance beneath the surface of the earth, there are in existence in the United States and elsewhere, deposits of native sulphur in admixture with igneous or other rock, calcium sulphate, earth, etc., in such form or location that economically working the same by the sub-surface fusion method is impracticable. The distillation of sulphur under atmospheric pressure is both slow and expensive, and is also dangerous due to ignition of the sulphur vapors which occurs at about 256° C., while sulphur boils at about 444° C. Therefore a process for the production of purified sulphur from material containing the same in elemental form seems highly desirable.

In my previous applications I have described methods for the purification of sulphur by distillation or sublimation of the same under reduced pressure or substantial vacuum, these previously described processes being especially applicable to the treatment of naturally occurring sulphur of a purity of 95 per cent or better. My further researches have disclosed that a similar apparatus to that already described by me, with or without mechanical modification depending upon the form in which the sulphur occurs and the nature and amount of impurity associated with it, may be employed for the recovery of sulphur from mechanical mixtures containing the same, and that the sulphur thus recovered, is obtained in a high state of purity and desirable physical condition.

If the recovery is carried out under a high vacuum and the amount of heat applied per unit of time is relatively great, the sulphur will distill from the conglomerate with which it has been associated in the form of vapors which condense as liquid sulphur of high purity. As previously described by me, by working at a modified rate, the purified sulphur can also be caused to condense in the form of minute, spherical or spheroidal particles without the production of liquid sulphur in the receiver, but for the purpose of recovery of sulphur from its ores, the details of the method employed will naturally depend upon the amount and nature of impurities associated with the sulphur.

One method of operation of the process embodied in the present application is as follows:—

An iron still of suitable size and shape is charged with the material containing sulphur. It has previously been found that where much calcium sulphate or other absorbent material is associated with the elemental sulphur, upon the application of heat there is a tendency for the liberated sulphur to become absorbed in the calcium sulphate when heat is applied, with the result that the sulphur is absorbed and only removed incompletely and with difficulty. In the conditions obtaining in my vacuum apparatus as described in a previous application, the liberated sulphur boils at a much lower temperature,—in fact at from 140° C. to 180 C.,—at which temperature it is well known that sulphur under ordinary atmospheric pressure is in a relatively non-liquid state.

Due to the materially lower temperature employed by me as the result of the high vacuum under which the sulphur is liquefied, gasified and subsequently condensed, a considerable fuel economy results, and if sufficient heat per unit of time is employed, the sulphur will distill much more rapidly than would be possible under normal atmospheric conditions, and with far less danger from ignition of the sulphur vapors, due to the practical absence of air or oxygen when working by my process.

As an example of the practical operation of my process, when operating upon a crude sulphur mixture containing about 98 per cent of absolute sulphur therein, employing a still which had a heating surface of about 3 feet 8 inches by 3 feet 8 inches, 442 pounds of purified sulphur was obtained in a period of 2 hours distillation, the sulphur so obtained being of 99.9 per cent purity, of brilliant yellow color, neutral reaction, and apparently free from occluded gases, bitumens or other impurities. In another example, a crude sulphur containing 12.7 per cent of ash upon ignition, when heated under vacuum in my process, gave a yield of 365 pounds of purified sulphur in 2 hours distillation, the sulphur obtained being of purity substantially as above indicated. The residue in the still contained commercially negligible amounts of free sulphur at the close of the operation. The distillation operation may be so modified as to speed or heating and degree of absoluteness of vacuum maintained during operation, that a portion or all of the sulphur volatilized may be condensed as minute, spherical or spheroidal particles of light weight instead of liquid sulphur. Where the sulphur is collected in the receiver in the liquid state, the temperature of the receiver during operation is kept above the melting point of sulphur, and the latter withdrawn therefrom periodically or at the close of the operation.

The residues in the still may be discharged mechanically if desired, by being allowed to drop by gravity into another chamber still under vacuum, so that there is no necessity for interrupting the operation to remove sulphur from the system. The charging of the apparatus may also be performed in a similar manner where it is desired to work the process continuously.

Having now described my method for producing purified sulphur from impure sulphur or ores containing the same in elemental form, what I claim as new and desire to secure by Letters Patent is:—

1. The method of recovery of sulphur from mineral matter containing the same in the elemental form, characterized by heating the said sulphur-containing matter in an apparatus under high vacuum and consisting of still and receiver, continuing heat until no further sulphur is vaporized and condensed in the receiving portion of the apparatus, the sulphur thus condensed being in a high state of purity.

2. A process of recovery of sulphur from mineral matter containing the same in the elemental form, consisting in heating said sulphur-containing mineral matter in an apparatus containing still and receiver both being maintained under high vacuum during the operation, heating being so regulated that the volatilized sulphur comes over in a form which condenses in the receiver in minute, spherical or spheroidal, amorphous, neutral particles of light weight, the process being continuous as to introduction of raw material and withdrawal of purified sulphur, as desired.

3. A process for the recovery of sulphur from mineral matter containing the same in the elemental form, consisting in heating said sulphur-containing mineral matter in an apparatus containing still and receiver, both being maintained under high vacuum during the operation, heating and other factors of working being so regulated that the sulphur is volatilized in the still and condenses in a liquid form in the receiver in a highly purified form, substantially as described.

4. A process for the recovery of sulphur from ores containing the same in elemental form comprising distilling the sulphur from the ore under a high vacuum, passing the vapors into a connected vacuum receiver and condensing said vapors.

This specification signed this sixth day of December, 1922.

CARL MARX.